United States Patent [19]

Roth

[11] Patent Number: 5,433,142

[45] Date of Patent: Jul. 18, 1995

[54] APPARATUS FOR IMPROVING THE QUALITY OF A FOODSTUFF

[75] Inventor: Eldon Roth, Dakota Dunes, S. Dak.

[73] Assignee: Freezing Machines, Inc. of Delaware

[21] Appl. No.: 210,571

[22] Filed: Mar. 18, 1994

[51] Int. Cl.⁶ .................... A23L 1/36; A23B 7/00
[52] U.S. Cl. ........................ 99/474; 99/483; 422/26; 422/112
[58] Field of Search ............ 99/474, 473, 483; 422/29, 28, 112

[56] References Cited

U.S. PATENT DOCUMENTS

| | | | |
|---|---|---|---|
| 1,061,443 | 5/1913 | Blosser | 422/26 |
| 1,355,476 | 10/1920 | Herring | |
| 2,229,360 | 1/1941 | Baer | 99/225 |
| 2,374,805 | 5/1945 | Camelford | 21/60 |
| 3,118,773 | 1/1964 | Bennett et al. | 99/182 |
| 3,549,528 | 12/1970 | Armstrong | 210/60 |
| 3,594,115 | 7/1971 | Wesley et al. | 21/54 |
| 4,059,919 | 11/1977 | Green | 47/1.1 |
| 4,062,646 | 12/1977 | Lodige et al. | 422/26 |
| 4,748,003 | 5/1988 | Riley | 422/112 |
| 4,944,919 | 7/1990 | Powell | 422/26 |
| 4,967,651 | 11/1990 | Hsieh et al. | 99/474 |
| 5,026,564 | 6/1991 | Hayden | 426/237 |
| 5,049,400 | 9/1991 | Hayden | 426/237 |
| 5,066,336 | 11/1991 | Hoffman et al. | 134/22.12 |
| 5,077,009 | 12/1991 | Subotics et al. | 422/40 |
| 5,124,125 | 6/1992 | Brent | 422/21 |
| 5,165,325 | 11/1992 | Akatsu | 99/275 |
| 5,180,553 | 1/1993 | Singer et al. | 422/28 |
| 5,271,893 | 12/1993 | Newman | 422/26 |
| 5,281,428 | 1/1994 | Morgan | 426/312 |
| 5,288,462 | 2/1994 | Carter | 422/39 |
| 5,305,688 | 4/1994 | Kotani et al. | 99/473 |

*Primary Examiner*—David A. Scherbel
*Assistant Examiner*—Reginald L. Alexander
*Attorney, Agent, or Firm*—Shaffer & Culbertson

[57] ABSTRACT

An apparatus for improving the quality of a foodstuff includes a container for containing the foodstuff to be processed and a working gas under an operating pressure. A compressing device places the working gas and the foodstuff under the desired operating pressure and this operating pressure is held for an operating period. The apparatus also includes an arrangement for releasing the operating pressure, preferably suddenly, allowing the foodstuff and any residual gas to go to a relatively lower pressure, which may be atmospheric pressure or a vacuum. This pressurization, hold, and pressure release cycle improves foodstuff quality by reducing undesirable microbe content. Also, the pressurization, hold, and release cycle improves color in meats.

8 Claims, 2 Drawing Sheets

APPARATUS FOR IMPROVING THE QUALITY OF A FOODSTUFF

BACKGROUND OF THE INVENTION

This invention relates to food processing. More particularly, the invention relates to an apparatus for improving the quality of a foodstuff by reducing living microbe and bacteria count in the foodstuff and improving color retention. The invention also encompasses a method for reducing microbe count in foodstuffs and for increasing color retention.

Almost all foods are processed in some way before reaching the consumer. For example, vegetables may be washed, trimmed, blanched, and frozen for distribution. Other examples are meat products which are separated from unusable elements, ground or chopped, mixed or blended, and often times frozen for distribution. Even lightly processed meats are cut or trimmed and then packaged.

Microbes invariably appear or grow in foodstuffs as they are processed or handled. Microbes are part of the natural decay process of organic material. Although some microbes may be relatively benign, others contribute to spoilage and some can cause serious illness if consumed. Lactic acid producing bacteria are examples of benign microbes while E. Coli, Salmonella, Staph, and Listeria bacteria in particular are pathogens and cause serious illness.

It is, therefore, desirable to control the growth of microbes or reduce microbe count in foodstuffs. Historically, microbe growth has been reduced by chemical additives or preservatives. Chemical additives or preservatives, however, may have undesirable side effects to consumers and, in any event, a growing population has expressed a desire for chemical additive or preservative-free food products. Alternatively to chemical additives or preservatives, heat has been used to kill microbes in foodstuffs. However, heat processing or sterilization often has an undesirable effect on the quality or characteristics of the foodstuff and may make the food product undesirable to the consumer. Also, heat sterilization in meats can kill all microbes, leaving the meat susceptible to the rapid growth of dangerous microbes or pathogens after sterilization.

Additionally, many foodstuffs are sensitive to processing and may have characteristics that are adversely effected during processing or storage. Raw meats in particular, lose their desired color during processing or while in distribution or storage prior to sale. Although the maximum packaged shelf-life of a cut of meat may be as much as 30 days when packaged in a CRYOVAC brand package, for example, the meat loses its desired color in this type of packaging and this color loss may render the meat undesirable to consumers.

Therefore, there has been a need in the food processing industry to reduce microbe count in the foodstuffs without chemical additives and without degrading the quality of the foodstuff as by heat processing. Furthermore, there has been a need in the food processing industry for maintaining the desirable characteristics, including color, in foodstuffs during processing or storage.

SUMMARY OF THE INVENTION

It is a general object of the invention to provide an apparatus and method for maintaining the quality of foodstuffs by reducing undesirable microbe content or count in foodstuffs without using chemical additives or heat processing and by maintaining desired foodstuff characteristics such as color, for example.

To accomplish this object the method according to the invention uses a pressurization and pressure release cycle with a working gas in contact with the foodstuff being processed. The method includes placing the foodstuff in contact with the working gas under an operating pressure. After holding the operating pressure on the working gas and foodstuff for an operating period, the method includes releasing the pressure, preferably suddenly. This pressurization, hold, release cycle may be repeated several times to produce the desired meat quality. Different pressures, gases, and operating periods may be used in each cycle. Although the mechanism by which microbes are killed in this pressure-cycling process is not now fully understood, it has been discovered that the process significantly reduces microbe count, that is, the number of living microbes in the foodstuff. Furthermore, it has been discovered that foodstuffs, particularly meat, treated with the pressurized working gas significantly enhances color retention.

Placing the foodstuff in contact with the working gas is preferably accomplished by placing the working gas in contact with the foodstuff and then pressurizing the working gas and foodstuff. Alternatively, the working gas may be applied to the foodstuff under pressure. In either case, working gas is held at the operating pressure for an operating period. The operating period may be an amount of time required for the working gas to penetrate to some depth from the surface of the foodstuff at the particular operating pressure. Higher operating pressures require less operating periods.

The pressure release is preferably done suddenly or instantaneously. For example, the pressure may be allowed to reduce to atmospheric pressure suddenly through a valve or orifice. It is believed that a sudden pressure release produces better microbe kill, however, sudden pressure release is not necessary for microbe kill or improved color retention in meats.

The method according to the invention may be performed as a batch process or a continuous process. In either case, the apparatus for performing the process includes a container for containing the foodstuff and working gas, and some means for placing the foodstuff and working gas in the container and removing the foodstuff and working gas from the container after treatment. The continuous process apparatus also preferably includes means for compressing the working gas in contact with the foodstuff to the operating pressure and means for releasing the pressure after the operating period. In the batch process, the foodstuff may be held in a pressure vessel and working gas applied under pressure or compressed into the vessel. After holding the working gas under the operating pressure for the operating period, the working gas pressure may be suddenly released through a suitable valve.

In the preferred continuous process, the method according to invention is performed in a reciprocating pump that serves to compress the working gas and foodstuff and also to transport the working gas and foodstuff through the system. The apparatus for performing the continuous process includes a cylinder head with a cylinder head chamber therein and a cylinder extending into the cylinder head chamber. A piston is positioned in the cylinder and driven by suitable means to reciprocate in the cylinder. Both an inlet passage and an outlet passage lead into the cylinder head chamber, the inlet passage containing an inlet valve and the outlet passage containing an outlet valve. Also, a flow-restricted device is associated with an outlet conduit that extends from the cylinder head chamber. The flow restricting device holds a back pressure against the pump stroke of the piston. A gas injection port leads either into the cylinder head chamber itself or into an inlet manifold that feeds the cylinder head chamber.

As the piston retracts in its cylinder, it draws foodstuff into the cylinder head chamber or allows foodstuff to flow into the cylinder head chamber through the inlet valve. The return stroke of the piston compresses the foodstuff and working gas against the flow-restricting valve or other arrangement and also pumps the material out of the outlet valve. At the flow restricting valve or other flow-restricting arrangement, the pressurized foodstuff and working gas preferably flashes to atmospheric pressure to kill microbes and release the free gas from the foodstuff.

These and other objects, advantages, and features of the invention will be apparent from the following description of the preferred embodiments, considered along with the accompanying drawings.

DESCRIPTION OF THE PREFERRED EMBODIMENTS

Figure 1:
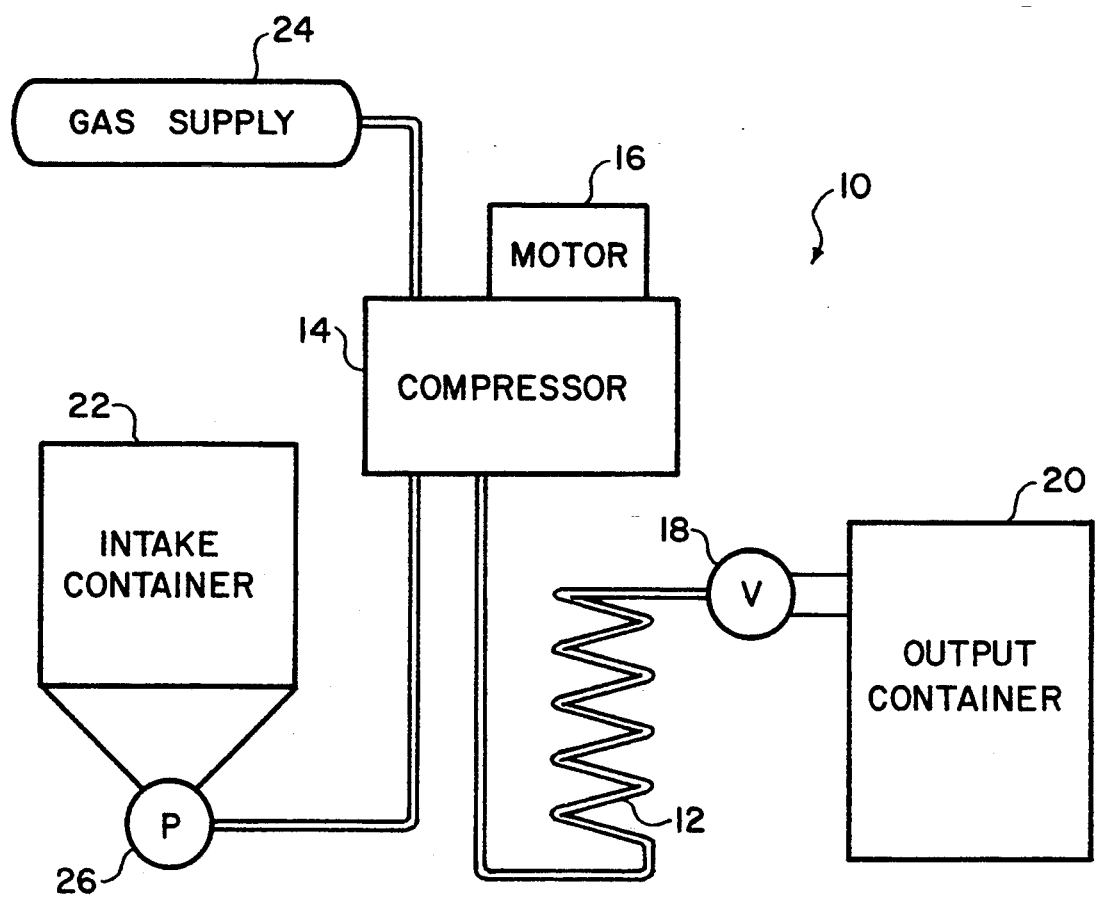
FIG. 1 is a mostly diagrammatic view of an apparatus embodying the principles of the invention for improving the quality of a foodstuff.
Figure 2:
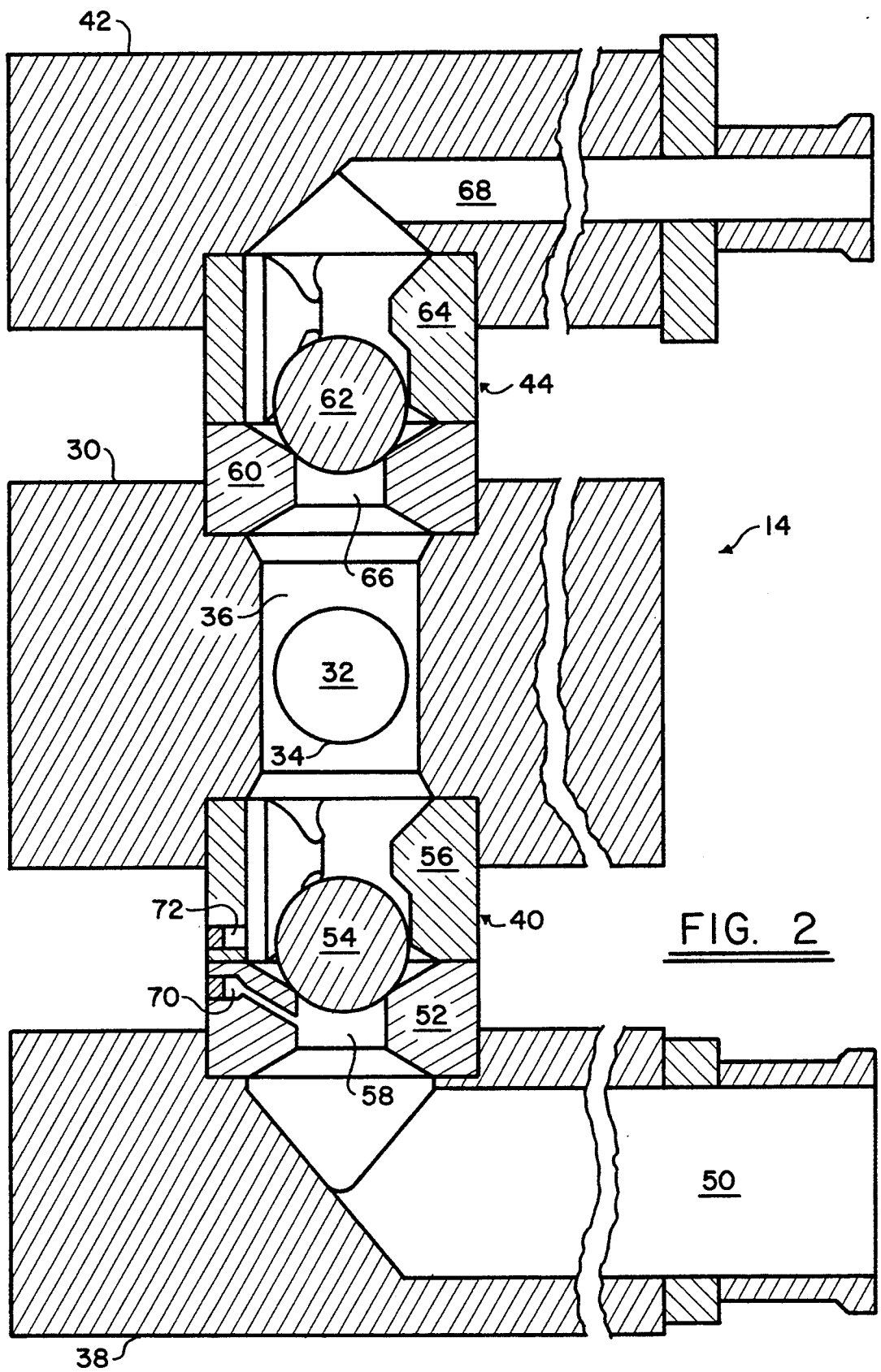
FIG. 2 is a partial longitudinal section view of the compressor used in the apparatus shown in FIG. 1.

FIGS. 1 and 2 show an apparatus 10 embodying the principles of the invention for improving the quality of a foodstuff and particularly for reducing microbe count in the foodstuff. Referring to FIG. 1, the apparatus 10 includes means, in this case processing conduit 12, for containing the foodstuff and working gas under an operating pressure. The pressure is applied by a compressor 14 driven by a suitable motor 16. A flow-restricting valve or other device 18 is associated with the conduit 12 for holding a back-pressure against the pressure applied by the compressor 14. The flow-restricting valve 18 opens to an output container 20. Foodstuff to be processed in the apparatus 10 is pumped from an in-take container 22 by feed pump 26 to the compressor 14, and the working gas supply 24 provides working gas which is then compressed in contact with the foodstuff.

When the container comprises the conduit 12, travel time of the foodstuff and working gas through the conduit allows the foodstuff to be held under the operating pressure for a sufficient operating period according to the invention. Thus this illustrated form of the invention provides for continuous processing with continuous foodstuff intake, compression with the working gas, holding under the operating pressure, and then pressure release. In this continuous processing form of the invention, other processing equipment may be connected in the conduit 12 for performing other functions on the foodstuff before the working gas pressure is released at device 18. Alternatively to the conduit 12, the container may, within the scope of the invention and claims, comprise a pressure vessel (not shown) with means for placing the foodstuff and working gas in the pressure vessel for processing in discrete batches. The working gas may be supplied directly under the desired operating pressure to the batches of foodstuff to be processed.

FIG. 2 illustrates the preferred compressor 14. The compressor 14 includes a cylinder head 30 with a piston 32 adapted to reciprocate within a cylinder 34 which opens into a chamber 36 in the cylinder head. As seen from the perspective of FIG. 2, the piston 32 would move transverse to the plane of the paper. An inlet manifold 38 is connected to the cylinder head 30 with an inlet valve 40, and an outlet manifold 42 is connected to the cylinder head via an outlet valve 44. Although FIG. 2 is broken away to show only one piston and cylinder arrangement in the cylinder head 30, it will be readily apparent to those skilled in the art that the compressor 14 could, and preferably would, include additional piston and cylinder arrangements. In one preferred form, the compressor 14 includes three separate pistons.

The inlet manifold 38 includes an inlet manifold passage 50 through which foodstuff reaches the inlet valve 40. The illustrated inlet valve 40 is a check valve comprising a seat 52, ball 54, and ball retainer 56, and defines an inlet passage 58 to the cylinder head chamber 36. Similarly, the outlet valve 44 comprises a check valve having a seat 60, ball 62, and ball retainer 64, and defines an outlet passage 66 connecting the cylinder head chamber 36 to a passage 68 extending through the outlet manifold 42.

The working gas is preferably supplied to the compressor 14 for compressing with the foodstuff, even though in other forms of the invention the working gas may simply be applied to the foodstuff under the desired operating pressure. The illustrated form of the invention shows two alternate injection points for injecting working gas to place the working gas in contact with the foodstuff being processed. The first working gas injection port 70 extends through the seat 52 of the inlet valve 40 on the inlet manifold side of the inlet valve ball 54. Working gas injected into the inlet manifold passage 50 through this first injection port 70 under a suitable pressure is drawn into the cylinder head chamber 36 along with the foodstuff. The alternate, second injection port 72 extends into the inlet passage 58 on the cylinder head side of the inlet valve ball 54. Thus the working gas injected through this second port 72 is injected directly into the cylinder head chamber 36 for compressing with the foodstuff.

The method of the invention and the operation of apparatus 10 may now be described with reference to FIGS. 1 and 2. The method first includes placing the foodstuff in contact with the working gas under an operating pressure. In the apparatus 10 shown in FIG. 1, the processing conduit 12 defines a high-pressure container for containing the foodstuff and working gas. The method also includes holding the foodstuff and working gas under the operating pressure for an operating period and then releasing the pressure. In the apparatus 10 shown in FIGS. 1 and 2, the step of releasing the pressure is accomplished by maintaining the output container 20 and the conduit downstream of the back-pressure device 18 at a low pressure, preferably near atmospheric pressure or at a vacuum.

The apparatus 10 shown in FIG. 1 uses the reciprocating piston pump or compressor 14 to place the foodstuff in contact with the working gas under the operating pressure. As shown in FIG. 1, the feed pump 26 pumps foodstuff from the intake container 22 to the inlet manifold passage 50 (FIG. 2) of the compressor 14 under an inlet pressure. Referring now to FIG. 2, as the piston 32 withdraws into the cylinder 34, it creates a low pressure in the cylinder head chamber 36 causing the ball 62 of the outlet valve 44 to seat and the ball 54 of the inlet valve 40 to unseat, drawing foodstuff into the cylinder head from the inlet manifold passage 50. When the first working gas injection port 70 is used, working gas is injected into the inlet manifold passage 50 and the working gas is drawn into the cylinder head chamber 36 along with the foodstuff. Alternatively, when the second port 72 is used, the working gas is injected directly into the cylinder head chamber 36 preferably during the intake stroke of the piston 32. In either case, when the piston 32 returns through the cylinder 34, it increases the pressure in the cylinder head chamber 36 causing the inlet ball 54 to seat in the inlet valve 38. The pressure continues to rise in the cylinder head chamber 36 until the pressure passes the pressure held in the outlet manifold passage 66 and processing conduit 12 by the flow restricting back-pressure device 18. At this point, the outlet valve ball 62 unseats to allow foodstuff and working gas under the operating pressure to move into the outlet manifold passage 66.

The pumping or compressing process continues each cycle of the piston 32 to compress foodstuff and working gas and transport the compressed working gas and foodstuff through the outlet manifold passage 66 and into the processing conduit 12. In this continuous pressurizing, holding, and releasing process, the pump speed and the processing conduit length are chosen to provide travel time of the foodstuff and compressed working gas in the processing conduit 12 equal to the required operating period.

After holding the foodstuff in contact with the working gas under the operating pressure for the operating period, the method continues with the step of releasing the pressure across the flow restricting device 18. Preferably, the pressure is released substantially instantaneously across the device 18 as the foodstuff is delivered into the output container 20. The output container 20 is preferably held at near atmospheric pressure or at least a relatively low pressure compared to the operating pressure. The contents of the output container 20 may also be held at a vacuum within the scope of the invention.

Alternatively to the continuous processing method possible with the apparatus 10 shown in FIGS. 1 and 2, the method of the invention encompasses a batch process. In this batch process, the step of placing the foodstuff in contact with the working gas under the operating pressure includes placing the foodstuff in a pressure vessel and then applying the working gas under the operating pressure. The operating pressure is then simply held on the pressure vessel for the operating period. This batch method is preferable, or maybe required, for some foodstuffs that cannot easily be passed through the valves of a reciprocating compressor as shown in FIG. 2. In particular, the batch processing method may be required for large pieces of food such as cuts of meat. In any event, in the batch process, the step of releasing the pressure is accomplished simply by releasing working gas pressure through a suitable pressure release valve associated with the pressure vessel. Pressure release is preferably performed instantaneously through a large bore valve since it is believed that the quicker pressure release provides better microbe kill. Alternatively, the pressure may be released gradually and still provide substantial improvement to the quality of the foodstuff including color retention.

High pressure could also be applied using centrifugal force in high speed centrifuges. Although gases would tend to migrate to lower gravity areas, some of these gases would be trapped in the foodstuffs. Pressure would be instantaneously released when foodstuffs are discharged from the centrifuge.

The apparatus and method of the invention may be used with essentially any working gas compatible with the particular foodstuff. Carbon dioxide, nitrogen, oxygen, and hydrogen, may all be used as a working gas according to the invention. Any of these working gases used in the apparatus and method of the invention provide microbe kill and do not substantially react chemically with most foodstuffs. For example, placing ground meat in contact with carbon dioxide gas under 3500 psi for approximately 2 minutes and then instantaneously releasing the gas pressure reduced bacteria count in the ground meat by 50%. Additionally, other gases such as air, ozone, carbon monoxide, chlorine, or sulfate gases may be employed as working gases according to the invention. Working gases may also be mixed to optimize the beneficial effect on the foodstuff being processed. Low atomic number gases such as hydrogen are believed to provide better penetration to the foodstuff and microbes and are, therefore, preferred working gases.

Oxygen is particularly useful for maintaining the color quality of meats. For example, ground meat placed in contact with oxygen under 3500 psi for approximately 2 minutes and then instantaneously released provided a 25% immediate improvement in the color of the meat as measured by a Hunter Laboratories COLORQUEST model color analyzing device. It is believed that other working gases provide similar improved color retention.

Operating pressures as low as 10 psig provide microbe kill and improved color. However, the lower operating pressures require longer operating periods. It is believed that the longer time is required in the low operating pressures to allow the working gas to fully penetrate the foodstuff at the lower pressure. Alternatively, relatively high operating pressures, as much as 4 to 5 thousand (4000 to 5000) psi may be employed in the apparatus and method of the invention. These higher pressures require a lower operating period to produce the desired microbe kill, foodstuff penetration, and resultant color improvement. Also, multiple pressurization, hold, and release cycles may be employed within the scope of the invention to produce the desired quality enhancement. The different pressurization cycles may have different pressure, duration, and working gas all within the scope of the invention.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. An apparatus for improving the quality of a foodstuff, the apparatus comprising:
   (a) a container for containing a foodstuff to be processed along with a working gas;
   (b) working gas delivery means for adding the working gas to the container;

(c) a cylinder extending into a cylinder head chamber which forms part of the container;

(d) a piston positioned within the cylinder;

(e) drive means associated with the cylinder for reciprocating the piston within the cylinder; and (f) pressure releasing means for releasing the operating pressure from the container after the operating period.

2. The apparatus of claim 1 wherein the gas delivery means includes:

(a) a working gas supply; and (b) a working gas injection port leading from the working gas supply into the cylinder head chamber.

3. The apparatus of claim 1 further including:

(a) an inlet valve in a cylinder head inlet passage leading into the cylinder head chamber;

(b) an outlet valve in a cylinder head outlet passage leading into the cylinder head chamber; and (c) container outlet restricting means associated with a container outlet for restricting the passage of foodstuff and operating gas out of the container.

4. The apparatus of claim 3 further comprising:

(a) an inlet manifold including an inlet manifold passage having an opening into the cylinder head inlet passage; and (b) inlet feed means for feeding the foodstuff into the inlet manifold passage under an inlet manifold pressure.

5. The apparatus of claim 4 wherein the gas delivery means includes:

(a) a working gas supply; and (b) a working gas injection port leading from the working gas supply to the cylinder head inlet passage at a point between the inlet valve and the inlet manifold.

6. The apparatus of claim 3 wherein the container includes:

(a) an outlet manifold having an outlet passage in communication with the cylinder head outlet passage.

7. The apparatus of claim 6 wherein:

(a) the container further includes a processing conduit connected to receive the foodstuff and working gas under the operating pressure from the outlet manifold; and (b) the container outlet restricting means includes a flow restricting device connected at an outlet end of the processing conduit.

8. The apparatus of claim 7 wherein:

(a) the pressure releasing means includes an outlet container connected to receive the foodstuff and working gas from processing conduit after the foodstuff and working gas passes through the flow restricting device, the contents of the outlet container kept at no greater than atmospheric pressure.

* * * * *